United States Patent [19]

Murray et al.

[11] Patent Number: 5,309,476
[45] Date of Patent: May 3, 1994

[54] AUTOMODE SIGNAL DETECTION IN FULL DUPLEX MODEMS

[75] Inventors: Jack T. Murray, Raleigh, N.C.; Gottfried Ungerboeck, Langnau, Switzerland; Malcolm S. Ware, Raleigh, N.C.

[73] Assignee: International Business Machines Corp., Armonk, N.Y.

[21] Appl. No.: 766,881

[22] Filed: Sep. 26, 1991

[51] Int. Cl.$^5$ .............................. H04L 5/16
[52] U.S. Cl. ..................... 375/8; 375/121; 375/80
[58] Field of Search ........................ 375/7-9, 375/121, 13, 80, 94; 379/93

[56] References Cited

U.S. PATENT DOCUMENTS

| | | | |
|---|---|---|---|
| 4,663,766 | 10/1984 | Bremer | 375/13 |
| 4,691,342 | 9/1987 | Waldron et al. | 375/9 |
| 4,890,316 | 12/1989 | Walsh et al. | 375/8 |
| 4,894,847 | 1/1990 | Tjahjadi et al. | 375/8 |

OTHER PUBLICATIONS

CCITT 'Data Communication over the Telephone Network', Series V Recommendations, Melbourne, Nov. 14-25, 1988, vol. 8.1, 1989, Geneva, CH, p. 71, paragraph 2.5.2.1, p. 71 table 1; p. 82 para. 1, p. 90, pp. 6.3.1-6.3.1.2, pp. 91-92 FIGS. 5-7.
IBM Technical Disclosure Bulletin, vol. 22, No. 5, Oct. 1979, New York, US pp. 1929-1930; D. Godard and D. Pilost; "Fast Determination of Transmission Modes in a Modem".
1988 IEEE Military Communications Conference MILCOM '88, Oct. 23-26, 1988 San Diego, CA US; vol. 2, pp. 431-436, IEEE, New York, US; K. Kim and A. Poldyoros: "Digital Modulation Classification: The BPSK versus OPDK Case", p. 432, paragraph 2.1-p. 433, line 5; FIG. 1.

Primary Examiner—Stephen Chin
Assistant Examiner—Don Vo
Attorney, Agent, or Firm—Thomas F. Galvin; Edward H. Duffield

[57] ABSTRACT

Method and apparatus for determining occurrence of an S1 modem identification sequence is disclosed. An S1 sequence is found to exist when the sum of conjugate complex multiplication of signal sample amplitudes taken at an interval T/2 result in a negative scalar value for an arbitrary number of sequential occurrences. Complex samples taken from incoming baseband waveform at twice the modulation rate are interleaved in pairs of two with two even numbered samples and two odd numbered samples being considered separately by first performing complex multiplication followed by scalar multiplication of an output of the complex multiplication and an output of the previous complex multiplication delayed by one modulation interval T. The separate results from the sets of pairs of signal samples are summed to form a scalar whose value when consistently less than 0 indicates the presence of an S1 modem identification sequence in accordance with the CCITT S1 recommendation.

6 Claims, 4 Drawing Sheets ns sequence called "S1".

AUTOMODE SIGNAL DETECTION IN FULL DUPLEX MODEMS

FIELD OF THE INVENTION

This invention relates generally to modems, data sets, line adapters and the like where analog modulated waveforms are to be transmitted from a sender to a receiver. More particularly, it relates specifically to automode sensing of modem speeds in accordance with the recommended CCITT modem identification signal sequence called "S1".

PRIOR ART

Automode sensing is employed in modems built according to the Consultative Committee of International Telegraph and Telephone (CCITT) V.22 and V.22bis standards to enable the modems to sense and properly distinguish between the V.22, 1200 bps modems and the V.22bis which may be 1200 or 2400 bps modems. The distinction is based upon sending and receiving during the start-up phase of a short, modulated signal sequence having a standard pattern called the "S1" sequence. The S1 sequence, when received and recognized by an answering V.22bis modem, indicates that the calling mode has V.22bis capabilities i.e., it is capable of sending and receiving at 2400 bit per second. The answering modem receiving the S1 sequence acknowledges the reception of an S1 sequence by also sending such a sequence; when such a sequence is properly received and detected by the calling modem, both modems can declare a V.22bis connection to exist and further start-up sequences may be exchanged to achieve full duplex transmission at the common data rate of 2400 bits per second. Failure of either modem in its mutual exchange of S1 sequences leads to an assumption by both that at least one of the modems is a V.22 capable modem, in which case, the start-up sequences proceed to achieve full duplex transmission at the common data rate of 1200 bps.

If the optimum sampling phase and carrier phase are known in advance, an S1 sequence can quickly be recognized by classical symbol detection methods in the receiving modems. Observance of the S1 sequence based upon the detection of alternating signs in the imaginary part of the complex signals $x_k$ is the distinctive feature acknowledged in the prior art as recognition of the reception of an S1 sequence. This technique, however, requires careful adjustment of the sampling phase $\tau$ and the carrier phase $\phi$, respectively. Such values are normally not conveniently available at startup because the calling modem begins transmission of its S1 sequence abruptly and without a preamble. The receiving or answering modem must then acquire proper sample phase timing $\tau$ and carrier phase synchronization $\phi$ very quickly if the S1 sequence is to be recognized by the classical symbol detection method. This proves to be very difficult in practice and often results in marginal detection performance. This in turn leads to a significant number of potential 2400 bps connections being missed. The same situation exists for calling modems which cannot establish timing phase and carrier phase synchronization from the startup signals received from the answering modem prior to an S1 sequence.

OBJECTS OF THE INVENTION

In light of the foregoing known difficulties with the prior art, it is therefore an object of this invention to provide an improved S1 sequence detection method which does not require synchronization of the sending and receiving modem's sampling phases and carrier phases.

It is a further object of this invention to provide a new and improved S1 sequence detection method for use in full duplex modems.

SUMMARY OF INVENTION

The S1 sequence in the CCITT V.22bis modem standard consists of a four phase shift keyed signal having alternating phase shifts of plus or minus 90 degrees transmitted at the modulation rate of 1 divided by T. In accordance with the present invention, the S1 complex sequence signal is amplitude sampled at twice per modulation interval T to obtain four complex values $x_k$ equal to $x_{2n-0}$, $x_{2n-1}$, $x_{2n-2}$ and $x_{2n-3}$, respectively. The samples are interleaved with the two even numbered samples being considered together and the two odd numbered samples being considered together, by performing a complex multiplication of the paired samples followed by scalar multiplication between the imaginary part from the complex multiplied samples and the time delayed result of the previous similar complex multiplication where, the time delay is equal to 1 modulation interval T. The same operations are conducted for the two odd numbered samples and the result of its scalar multiplication is added with the result of the first scalar multiplication in a summing operation. It has been discovered that when the sign of the resultant sum is negative i.e. where the sum is less than zero continuously for successive sets of samples, that an S1 sequence exists. In order to verify the occurrence of the S1 sequence, an arbitrary count of sequential findings of the value of the sum being less than zero is made. When the count validity threshold is reached, the S1 signal is viewed as valid and detected. Counting and the summing operations continue until a non-negative value for the sum is found, thereby detecting the end of the S1 sequence.

BRIEF DESCRIPTION OF DRAWINGS

The foregoing and yet other objects that have not been specifically enumerated are met in a preferred embodiment of the invention in which.

DETAILED DESCRIPTION OF PREFERRED EMBODIMENT

Figure 1:
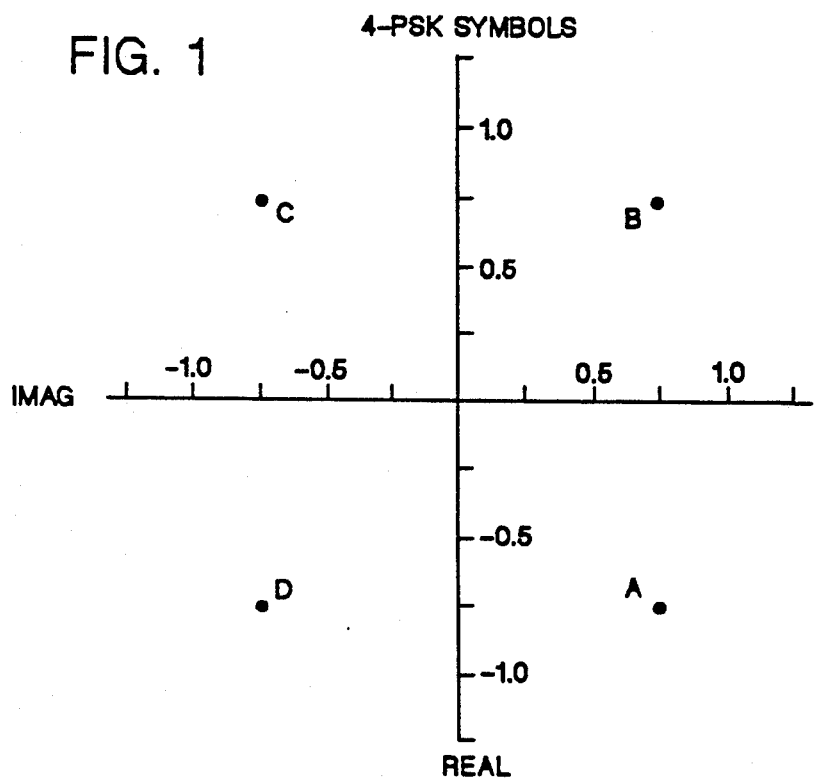
FIG. 1 illustrates the four phase shift keyed symbol transmissions base in a polar coordinate diagram illustrating symbols ABC and D.
Figure 2:
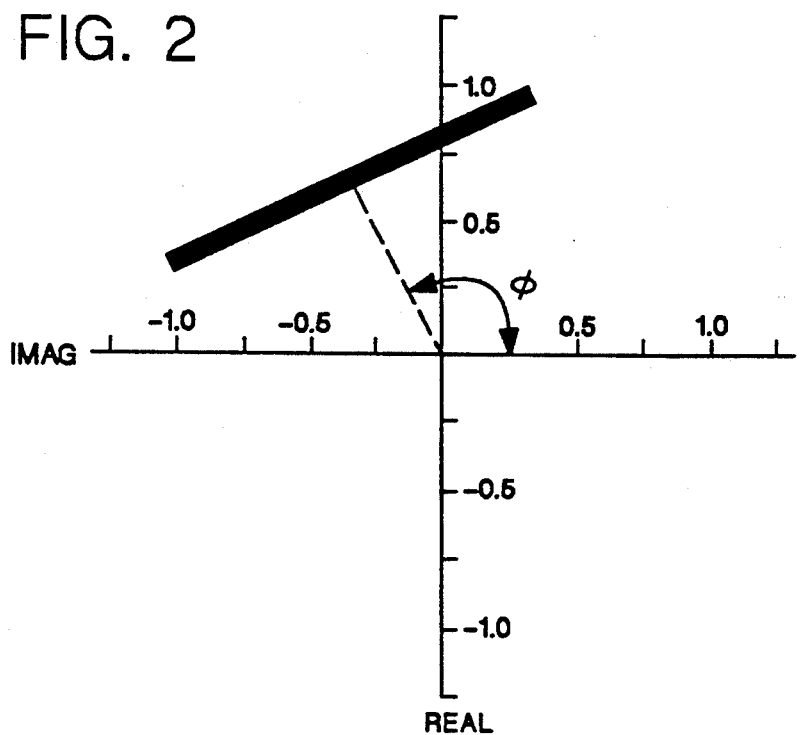
FIG. 2 illustrates a modulated complex base band S1 sequence as it would be seen over a continuous time on an oscilloscope at a receiver receiving an S1 baseband sequence with an arbitrary phase angle phi.
Figure 3A:
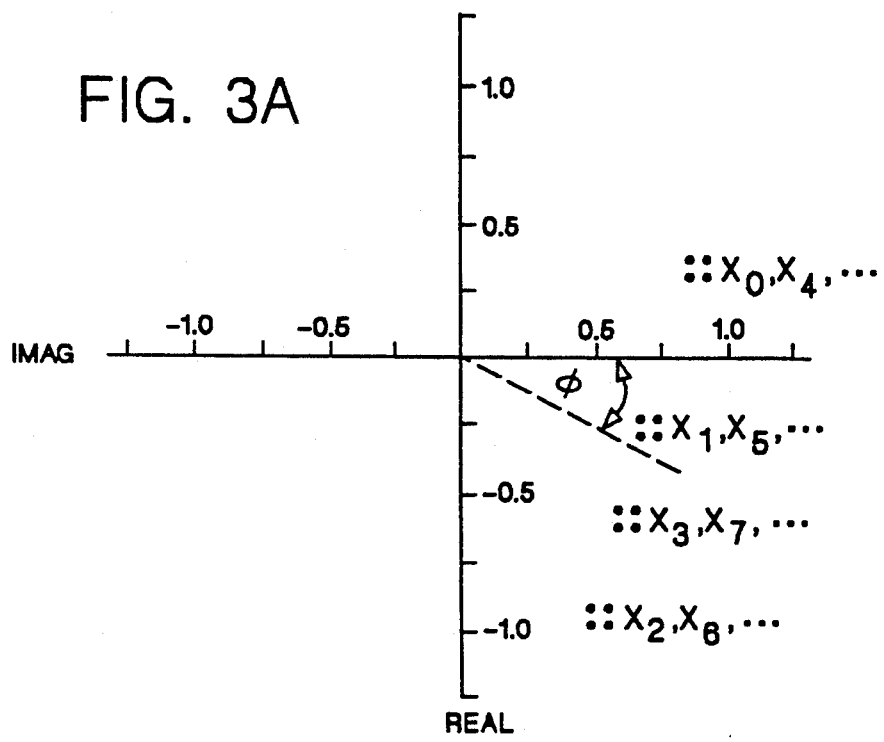
FIG. 3a illustrates the results of sampling an S1 sequence at a receiver to measure instantaneous amplitudes at four sampling times at T/2 intervals relative to an arbitrary clock, $\tau$, and carrier phases $\phi$ in the complex number domain to obtain $x_{2n-0}$, $x_{2n-1}$, $X_{2n-2}$, $x_{2n-3}$ sample sequences.
Figure 3B:
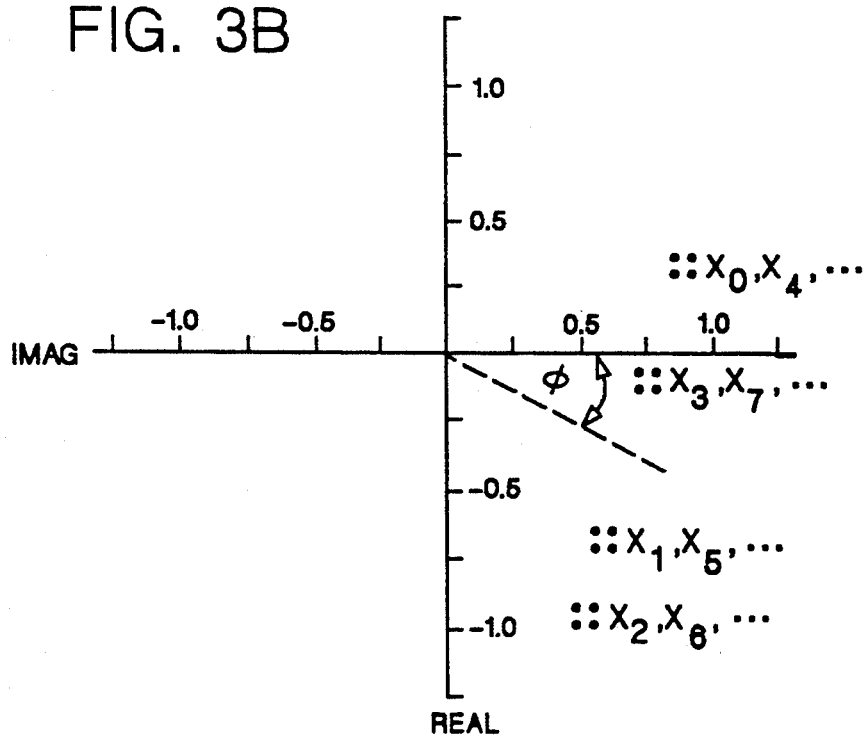
FIG. 3b illustrates the result of similar sampling in the complex domain by complex baseband sampling known in the art and at a different arbitrary clock phase $\tau$ when both FIGS. 3a and 3b have the same arbitrary carrier phase $\phi$.

This invention eliminates the prior requirement for synchronization of the carrier phase and sampling phase between sending and receiving modems prior to accurate detection of an S1 identification signal sequence. It has been found that certain mathematical combinations of the complex signal samples lead to a correlation that uniquely identifies an S1 sequence if the signal samples are spaced at the modulation interval, T. It has been found that two sets of T-spaced, "interlaced" (that is time alternated samples as shall appear herein) samples may be used to form sample sets which are processed at each modulation interval to yield imaginary components. The imaginary components are then combined to form a sum or metric which is invariant to either sampling or carrier phase differences. Further filtering of this metric, via appropriate low pass filters combined with counting of sequential occurrences of a sum correlation in comparison with a threshold count for detection, completes the process of S1 signal detection.

In the absence of transmission distortion and noise, the CCITT S1 signal set when complex sampled at a rate T/2 yields complex sampled signal samples of the form:

$$x_k(S1) = \frac{1}{\sqrt{2}}\left[1 + j\cos\left(\frac{\pi}{T}\tau + k\frac{\pi}{2}\right)\right]e^{j\phi}, \quad \text{EQ. 1}$$

In equation 1, $\tau$ and $\phi$ may be arbitrary sampling timing phases and carrier phases, respectively. Also, in these equations, k is an integer having a range from 0 to n, $v_{cos,n}$ represents the imaginary part of a complex correlation of signal samples $x_{2n-0}$ and $x^*_{2n-2}$, n is an integer value from 0, 1, etc. to any arbitrary limit, $v_{sin,n}$ is the imaginary part of the complex correlation of the signal sample $x_{2n-1}$ and $x^*_{2n-3}$, where the asterisk stands for the complex conjugate of the variables. $V_{cos,n-1}$ is another sampled modulation interval occurring at some time T in the past where the samples $v_{cos,n}$ are taken at the rate of T/2 as stated above. $\epsilon$ is the low pass filter time constant variable as used in these equations. To detect an S1 sequence in accordance with the invention, the following algorithms must be performed:

$$v_{cos,n} = Im\{x_{2n-0}x^*_{2n-2}\} = \left[\cos\left(\frac{\pi}{T}\tau\right)(-1)^n\right]. \quad \text{EQ. 2}$$

$$v_{sin,n} = Im\{x_{2n-1}x^*_{2n-3}\} = \left[\sin\left(\frac{\pi}{T}\tau\right)(-1)^n\right]. \quad \text{EQ. 3}$$

$$u_n = v_{cos,n}v_{cos,n-1} + v_{sin,n}v_{sin,n-1} = [-1]. \quad \text{EQ. 4}$$

$$S1\_CNT \leftarrow \begin{cases} S1\_CNT + 1, & u_n < 0, \\ 0, & u_n \geq 0. \end{cases} \quad \text{EQ. 5}$$

The values given in the brackets on the right-hand sides of equations 2, 3 and 4 are valid when the incoming signal $x_k$ is an S1 signal. It may be seen that the negative value assumed by the sum in equation 4, $u_n$ does not depend upon the sampling phase and carrier phase since those terms drop out in the sum which is formed. If noise or random data are received, the sum $u_n$ will fluctuate randomly about 0, but if an S1 sequence is being sent, the sum $u_n$ win always be negative. Similarly, if an unmodulated carrier signal is received, $u_n$ vanishes in the mean and random noise would prevail. Hence, a true detection may be obtained by observing that the metric $u_n$ is less than 0 during a specified number of consecutive modulation intervals. Any arbitrary number may be chosen, but a suitable criterion for a reception of an S1 sequence has been found by experimentation to be a sequential count of 32 consecutive occurrences of the metric $u_n$ less than 0.

Greater robustness against noise or jitter can be achieved by applying the filtering function $\xi$ to the metric $u_n$ as shown by equation 6:

$$u_n = (1-\epsilon)u_{n-1} + \epsilon(v_{cos,n}v_{cos,n-1} + v_{sin,n}v_{sin,n-1}), \quad 0 < \epsilon < 1. \quad \text{EQ. 6}$$

Either an actual analog hardware filter may be built with the filtering coefficient $\xi$ lying in the range of 0 to 1 as shown by equation 6, or a digitally implemented algorithm for filtering may be employed.

Figure 4:
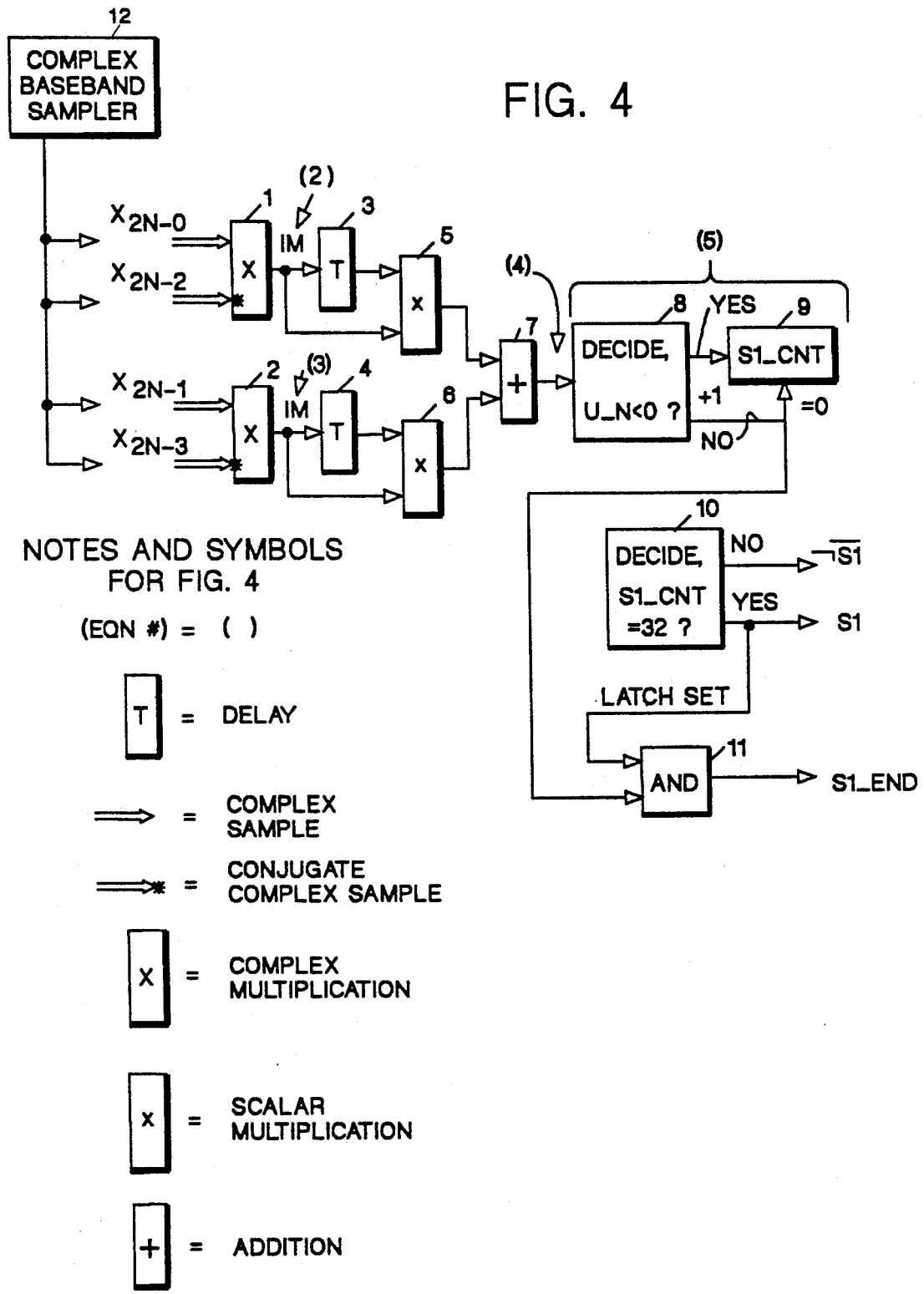
FIG. 4 illustrates a preferred embodiment of the circuitry for combining complex samples and calculating the results which lead to detection of an S1 sequence in accordance with the invention.

The preferred embodiment of circuitry for performing the algorithm in equations 2 through 5 is shown in FIG. 4.

Turning to FIG. 4, an incoming analog waveform signal at the receiving point is complex sampled by the sampler 12 which may be simply an analog to digital converters strobed at equal to or more than the Nyquist sampling rate. The S1 processing rate selected is, as discussed earlier, twice the modulation rate, or, an interval of T/2. After appropriate filtering and demodulation, consecutive baseband samples are repetitively made and fed into the inputs of the complex multipliers 1 and 2, respectively. Beginning at any arbitrary point, an incoming signal will be sampled to result in a sample $x_{2n}$, a succeeding sample $x_{2n-1}$, another sample $x_{2n-2}$ and a fourth sample $x_{2n-3}$. Each group of four consecutive samples is handled in the complex multipliers 1 and 2 with the even numbered and the odd numbered samples being taken together. Thus the input into the complex multiplier 1, for example comprises a signal $x_{2n}$ and the next even numbered sample $x_{2n-2}$ (conjugated) which is displaced in time by T.

The inputs to the complex multiplier 2 are, likewise, the complex sample $x_{2n-1}$ and $x_{2n-3}$ (conjugated). The even numbered samples and the odd numbered samples at the sampling rate T/2 thus comprise the separate inputs to the different complex multipliers 1 and 2 as shown in FIG. 4. The complex sample signals have the form as shown above in equation 1. The two sets of complex samples represent an arbitrary clock time and its displacement by T/2.

The output from the complex multipliers 1 and 2 in FIG. 4 are the starting point for the calculations for the equations 2 and 3 for calculating the imaginary component of $v_{cos,n}$ and $v_{sin,n}$, respectively. This fact is indicated in FIG. 4 by the numeral 2(Im) (for "imaginary") after the output of the complex multiplier 1 and the numeral 3(Im) after the output of the complex multiplier 2. Each of these results is inputted to a time delay circuit 3 or 4, respectively, where a 1 modulation period time delay T is introduced prior to feeding the time delayed calculated imaginary value and the current imaginary value directly to the scalar multiplier 5 as shown in FIG. 4, or for the other two complex and conjugate complex samples $x_{2n-1}$ and $x_{2n-3}$, to the scalar multiplier 6 as shown. The results are summed together in the adder 7 whose output is the metric $u_n$ as shown by equation 4. A decision/comparator circuit 8 receives the input which is the sum. The decision circuit compares the value $u_n$ to 0 to determine if a negative value is present. If a negative value is present, the "yes" output increments the S1 counter 9 by one and if a non negative result occurs in comparator 8, the "no" output resets counter 9 to zero.

The contents of counter 9 are continuously monitored by comparator 10 having an arbitrary threshold value for detection of a valid S1 sequence. It has been found that a threshold of 32 is an appropriate level for comparison. When 32 consecutive occurrences of the metric $u_n$ being less than 0 have been counted in counter 9, the comparator 10 will indicate and latch the detection of an S1 sequence, but will otherwise indicate "not S1" as shown. AND gate 11 receives the S1 detected input and the $u_n$ non negative input to logically indicate the end of the S1 sequence, AND gate 11 is conditioned because negative value $u_n$ have been found in sufficient number to indicate the presence of an S1 signal, and then comparator 8 will later indicate the occurrence of a non-negative value for $u_n$.

Figure 6:
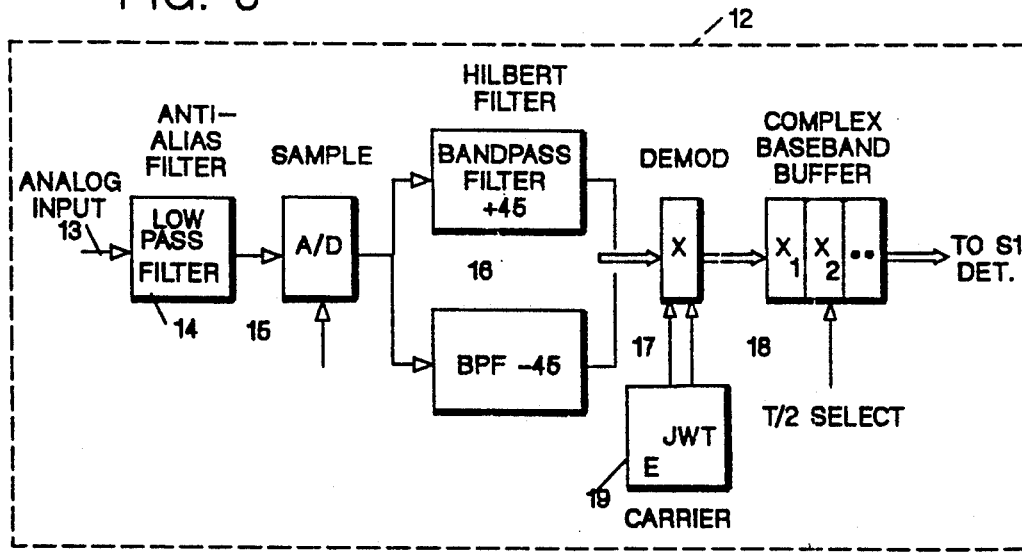
FIG. 6 illustrates schematically the complex sampler used to provide the sample stream for use in the preferred embodiment of FIG. 4.

FIG. 6 shows a typical modem front end for producing a complex baseband signal sample sequence as specified for input to the S1 detector.

Analog Low Pass Filter (LPF) receives a real analog line signal at its input and provides a controlled spectrum version of this analog signal to A/D convertor 15 Spectrum control reduces sampling foldover interference at the convertor output. The A/D convertor samples the anti-alias filter output periodically at a uniform rate, typically greater than the minimum rate specified by sampling theory, (i.e. Nyquist rate). Digitally quantized signal values from the A/D convertor 15 are fed identically to a "Hilbert" filter-pair 16 which have further identical band-control responses but differing phase responses to yield a complex sampled signal pair at the input to a demodulator 17. Demodulator 17 receives a second complex carrier input sequence from 19 and performs a vector rotation of the signal by the given carrier angle-demodulation. Original "passband" samples are thus converted to complex baseband samples. Sequences of these baseband samples are buffered in 18 under control of a rate selector input to yield T/2 spaced complex baseband signal samples as required by the S1 detector, FIG. 4.

Figure 5:
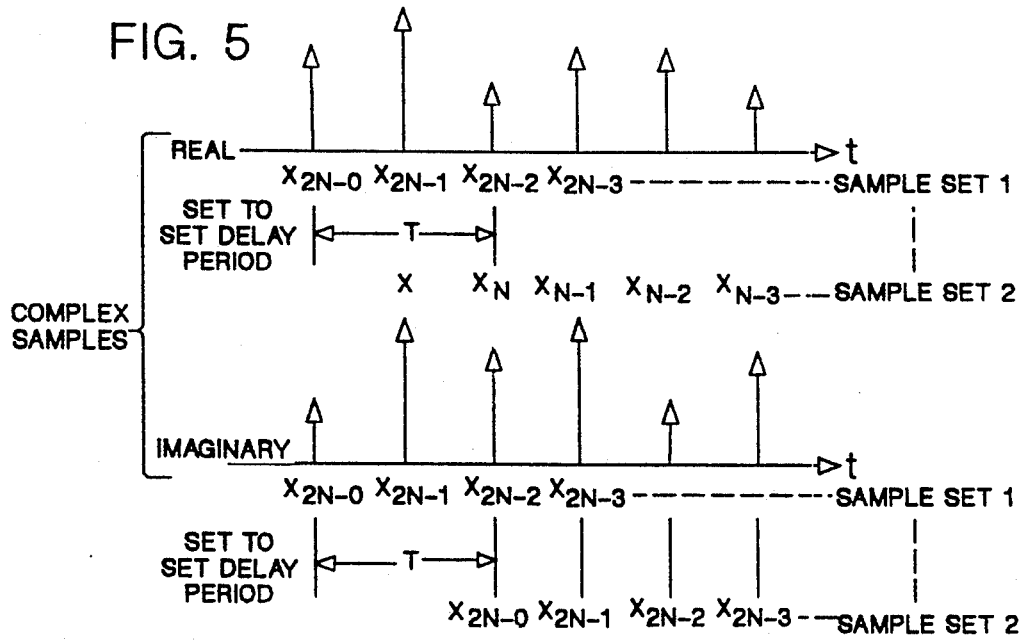
FIG. 5 illustrates schematically the timing and placement of the complex samples in the real and imaginary domains as utilized in the preferred embodiment of the invention.

Complex samples from sampler 12 are illustrated in FIG. 5 schematically to show their placement as sample set 1 and sample set 2, etc. which would continue indefinitely. It may be seen that the numbering of the samples and their use in the circuitry for both the real and imaginary components are shifted by a time period delay T.

Thus, after establishing an incoming signal, the first two samples win provide first inputs to the complex multipliers 1 and 2 and the next two samples will provide second inputs to the two complex multipliers, the outputs of which will be delayed by a period T for scalar multiplication in the multipliers 5 and 6 of FIG. 4. It may thus be seen that incoming samples will be sequentially taken, but that a new calculation will occur only after two new samples have been obtained while the two earliest obtained samples will no longer be utilized when fifth and sixth samples, respectively, have been received etc.

It may be observed that the embodiment shown in FIG. 4 may be easily realized in the hardware as shown or may be implemented as a program in a simple computer, provided appropriate account is kept of the fact that some of the sample values represent imaginary numbers. In equations 2 and 3, $x_{2n-2}$ and $x_{2n-3}$ are conjugate complex samples and are indicated by the asterisk over the x as is also shown in the legend to the drawing FIG. 4.

Returning to FIG. 4, the logical flow is given for performing the algorithm as described by equations 2 through 5 above. As shown in FIG. 4, four complex data samples are processed at each T time interval from $x_{n-0}$ to $x_{n-3}$ which is shown schematically in FIG. 5. FIG. 5 is for two adjacent T time intervals. These four samples constitute two interlaced sample pairs in which successive complex sample values are taken at sampling times spaced T/2 intervals apart. Each T interval, therefor, will contain two new complex samples. When two new complex signal samples are received, all of the samples are indexed so that the two oldest samples are replaced. The pairs of samples are for two different clock or sample sets as indicated by FIG. 5. The conjugate multiplications indicated are performed in the multiplier blocks 1 and 2 in FIG. 4 to rotate the more recently received complex samples through the polar angles of the previous T-spaced samples. As expected, an imaginary result for such differential rotation during the S1 sequence will have alternating mathematical signs. These imaginary components as shown by equations 2 and 3, respectively, will satisfy a particular condition when the S1 alternating ABAB symbol set is received. Each imaginary component win be multiplied by the previous imaginary component delayed by one modulation period T from the same source i.e. the delay win occur in the blocks 3 and 4 in FIG. 4 and the multiplication in blocks 5 and 6 to obtain the scalar of the multiplication of the imaginary component by the previous delayed imaginary component.

The expected value for the product of the multiplication during the alternating S1 sequence ABAB is either minus 1 or 0, depending upon the specific arbitrary clock position at which the samples are chosen. One may note that there are two like channels for this calculation in FIG. 4 comprising blocks 1, 3 and 5 in one channel and blocks 2, 4 and 6 in the other. The channels differ in their clock positions as shown by the sample index used at their inputs. Therefore the output of blocks 5 and 6 will generate an expected sequence of $-1, -1 \ldots$ from one of the blocks and 0, 0 from the other or vice versa; or both blocks may have an output of $-0.5$. Block 7 combines the results of the two scalar multiplications to form the sum $u_n$ of equation 4. This is a linear addition operation to form at its output a sequence of approximately $-1, -1 \ldots$ so long as an S1 sequence is present. By maintaining a running count of the occurrence $u_n$ less than 0 and testing it against an appropriate threshold count, a valid S1 sequence may be detected. At each interval T, the output of block 7 is tested for a negative value in block 8. And if a negative value is found, the running count in counter 9 is incremented by 1, while otherwise the count is reset to 0. When an arbitrary number of consecutive negative values has been found, for example 32 T interval results being less than 0, one may accept the fact that an S1 occurrence is indicated. Any other non S1 valid sequence or noise interference will cause the output of block 7 to violate the expected test value of less than 0 and will cause the running count to reset to 0, thereby keeping the S1 count in counter 9 below the threshold value. The end of the valid S1 sequence is also easily detected and the precise end of the S1 signal is needed for other events in most modems. Block 11 in FIG. 4 logically combines the latched valid decision from block 10 that an S1 sequence is detected with the running decision of the value sequence from block 7 and searches for any violation of the $-1, -1 \ldots$ pattern i.e., if a value greater than 0 or 0 is found, this marks the S1 sequence end and it is so indicated.

Implementation of a software program for implementing the algorithm for forming the sum of equation 4 by first calculating the results of equations 2 and 3 from inputted samples having the form as shown in equation 1 are self-evident and need no further description.

Having thus described our invention with reference to a preferred embodiment, what is set forth in the claims which follows is included by way of example only and not by way of limitation wherefore what is claimed and desired to be protected by letters patent is:

We claim:

1. In a currently receiving modem a method of detecting a received Consultative Committee of Internal Telephone and Telegraph (CCITT) S1 standard modem identification signal sequence being sent by a currently sending modem, comprising steps of:

Complex sampling of amplitude of received baseband signals at a rate of twice a carrier modulation rate to yield four consecutive samples $x_{2n-0}$, $x_{2n-1}$, $x_{2n-2}$, and $x_{2n-3}$ of the form:

$$x_k(S1) = \frac{1}{\sqrt{2}}\left(1 + j\cos\left(\frac{\pi}{T}\tau + k\frac{\pi}{2}\right)\right)e^{j\phi},$$

where $\tau$ and $\phi$ may be an arbitrary value of a sampling phase and carrier phase, respectively, n is an integer, k is an integer having range from 0 to n and T is a modulation interval;

Forming a sum $u_n$ in accordance with $u_n = v_{cos,n}v_{cos,n-1} + v_{sin,n}v_{sin,n-1}$ where $v_{cos,n}$ is $$v_{cos,n} = Im\{x_{2n-0} x^*_{2n-2}\} = \left(\cos\left(\frac{\pi}{T}\tau\right)(-1)^n\right),$$

and $v_{sin,n}$ is $$v_{sin,n} = Im\{x_{2n-1} x^*_{2n-3}\} = \left(\sin\left(\frac{\pi}{T}\tau\right)(-1)^n\right);$$

Counting an arbitrary number of consecutive occurrences of a value of said sum being less than 0 as indicative of reception of said signal sequence; and Establishing full duplex communications with said currently sending modem by sending one or more start-up sequences.

2. A method as described in claim 1, wherein: said complex sampling further includes the step of forming interlaced sample value pairs from each group of four consecutive samples $x_n$ by choosing the two even numbered samples $x_{2n-0}$ and $x_{2n-2}$ and the two odd numbered samples, $x_{2n-1}$ and $x_{2n-3}$, for use in said sum forming step.

3. A method as described in claim 1 or claim 2, wherein:

said forming of said sum $u_n$ further includes filtering said sum against random noise and distortion by multiplying said sum $u_n$ by a filtering function of the form $$u_n = (1-\epsilon)u_{n-1} + \epsilon(v_{cos,n}v_{cos,n-1} + v_{sin,n}v_{sin,n-1}),$$
$$0 < \epsilon < 1.$$

where $\xi$ is greater than 0 and less than 1.

4. A method as described in claim 1 or claim 2, wherein:

Said complex sampling is continued after an indication of said signal sequence being received has occurred until a violation of said sum $u_n$ less than 0 is found, whereupon an end to said signal sequence is indicated.

5. A method as described in claim 3, wherein:

Said complex sampling is continued after an indication of said signal sequence being received has occurred until a violation of said sum $u_n$ less than 0 is found, whereupon an end to said signal sequence is indicated.

6. Modem apparatus having signal reception and complex sampling means and means for detecting receipt of a modem identification signal having a form specified as S1 by the Consultative Committee of International Telephone and Telegraph, comprising first multiplication means connected to receive complex baseband signal samples from said complex sampling means, said first multiplication means forming complex products of alternative consecutive ones of said complex baseband signal samples;

time delay means connected to said first multiplication means for delaying transmission of said complex products by one modulation interval, T; and second multiplication means connected to receive both the output of said first multiplication means and the output of said time delay means, said second multiplication means forming scalar products thereof; and summing means connected to said second multiplication means and receiving said scalar products therefrom to form the sum of said scalar products therefrom;

first comparison means connected to said summing means for determining whether said sum is a negative value; and counting means connected to said first comparison for counting consecutive negative instances of comparison; and Second comparison means connected to said counting means for comparing a count therefrom to an arbitrary value to indicate occurrence of a modem identification sequence.

* * * * *